US011820851B2

(12) United States Patent
Kim et al.

(10) Patent No.: US 11,820,851 B2
(45) Date of Patent: Nov. 21, 2023

(54) METHOD OF PREPARING GRAFT COPOLYMER POWDER

(71) Applicant: LG CHEM, LTD., Seoul (KR)

(72) Inventors: Min Jung Kim, Daejeon (KR); Yong Yeon Hwang, Daejeon (KR); Bong Keun Ahn, Daejeon (KR); Wang Rae Joe, Daejeon (KR); Jang Won Park, Daejeon (KR); Ji Yoon Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 661 days.

(21) Appl. No.: 17/051,757

(22) PCT Filed: Oct. 10, 2019

(86) PCT No.: PCT/KR2019/013278
§ 371 (c)(1),
(2) Date: Oct. 29, 2020

(87) PCT Pub. No.: WO2020/080735
PCT Pub. Date: Apr. 23, 2020

(65) Prior Publication Data
US 2021/0246236 A1    Aug. 12, 2021

(30) Foreign Application Priority Data
Oct. 19, 2018   (KR) .................. 10-2018-0125522

(51) Int. Cl.
| C08J 3/16 | (2006.01) |
| C08L 25/12 | (2006.01) |
| C08F 6/22 | (2006.01) |
| C08F 2/22 | (2006.01) |
| C08F 12/08 | (2006.01) |
| C08F 20/14 | (2006.01) |
| C08F 20/44 | (2006.01) |
| C08F 265/06 | (2006.01) |

(52) U.S. Cl.
CPC ............. C08F 6/22 (2013.01); C08F 2/22 (2013.01); C08F 12/08 (2013.01); C08F 20/14 (2013.01); C08F 20/44 (2013.01); C08F 265/06 (2013.01)

(58) Field of Classification Search
CPC .................................... C08J 3/16; C08L 25/12
USPC .......................................... 525/70, 238, 241
See application file for complete search history.

(56) References Cited

U.S. PATENT DOCUMENTS

| 5,541,256 A * | 7/1996 | Takaki ................ C08J 3/005 525/82 |
| 10,487,204 B2 | 11/2019 | Ahn et al. |
| 2002/0111397 A1 | 8/2002 | Eichenauer |
| 2010/0048816 A1 * | 2/2010 | Ryu .................... C08F 285/00 525/71 |
| 2016/0152806 A1 | 6/2016 | Park et al. |
| 2016/0304651 A1 | 10/2016 | Han et al. |
| 2021/0002472 A1 | 1/2021 | Ahn et al. |
| 2021/0171695 A1 | 6/2021 | Kim et al. |

FOREIGN PATENT DOCUMENTS

| CN | 1481395 A | 3/2004 | |
| CN | 105008421 A | 10/2015 | |
| EP | 1514883 A1 * | 3/2005 | ........... C08F 257/02 |
| EP | 3363859 A2 | 8/2018 | |
| EP | 3708599 A1 | 9/2020 | |
| JP | H04306252 A | 10/1992 | |
| JP | 2853987 B2 | 2/1999 | |
| JP | 2014530957 A | 11/2014 | |
| KR | 100339159 B1 | 11/2002 | |
| KR | 1020050015396 A | 2/2005 | |
| KR | 1020070029667 A | 3/2007 | |
| KR | 1020100023463 A | 3/2010 | |
| KR | 1020130090732 A | 8/2013 | |
| KR | 1020150026404 A | 3/2015 | |
| KR | 101553886 B1 | 9/2015 | |
| KR | 1020160081497 A | 7/2016 | |
| KR | 1020180047949 A | 5/2018 | |
| WO | WO2018174395 A1 | 9/2018 | |

OTHER PUBLICATIONS

Extended European Search Report for EP Application 19872656.4, dated Jul. 7, 2021.
Search Report for International Application No. PCT/KR2019/013278, dated Jan. 17, 2020.

* cited by examiner

*Primary Examiner* — Michael J Feely

(57) ABSTRACT

The present invention relates to a method of preparing a graft copolymer powder, which includes: preparing a seed by adding one or more selected from the group consisting of an alkyl (meth)acrylate-based monomer, an aromatic vinyl-based monomer and a vinyl cyan-based monomer to a reactor and carrying out polymerization; preparing a core in the presence of the seed by adding an alkyl (meth)acrylate-based monomer and carrying out polymerization; and preparing a graft copolymer latex in the presence of the core by adding an aromatic vinyl-based monomer and a vinyl cyan-based monomer and carrying out polymerization; adding an alkyl methacrylate-based polymer to the graft copolymer latex and carrying out coagulation, and more particularly, to a method of preparing a graft copolymer powder that is excellent in weather resistance, fluidity, mechanical properties, surface gloss and appearance quality.

13 Claims, No Drawings

METHOD OF PREPARING GRAFT COPOLYMER POWDER

CROSS-REFERENCE TO RELATED APPLICATION

This application is a National Phase of International Application No. PCT/KR2019/013278, filed on Oct. 10, 2019, which claims priority to and the benefit of Korean Patent Application No. 10-2018-0125522, filed on Oct. 19, 2018, the disclosures of which are incorporated herein by reference in its entirety.

TECHNICAL FIELD

The present invention relates to a method of preparing a graft copolymer powder, and more particularly, to a method of preparing a graft copolymer powder having improved weather resistance, improved surface gloss and improved appearance quality while maintaining basic properties.

BACKGROUND ART

In recent years, there is an increasing need for enhanced weather resistance in addition to enhanced heat resistance in automotive thermoplastic resin compositions containing acrylonitrile-styrene-acrylate (ASA) graft copolymers.

Therefore, a method of using a core having a small particle diameter has been proposed, but this method has a problem in that mechanical properties and fluidity are degraded. Also, a method of graft-copolymerizing an aromatic vinyl-based monomer and a vinyl cyan-based monomer with an alkyl (meth)acrylate-based monomer such as methyl methacrylate and the like during the formation of a shell has been proposed, but this method has a problem in that heat resistance and mechanical properties are degraded. In addition, a method of adding poly(methyl methacrylate) during ASA graft copolymer compounding has been proposed, but this method has a problem in that although weather resistance is improved, heat resistance and mechanical properties are degraded.

Therefore, there is a demand for the development of a graft copolymer that is excellent in all of heat resistance, weather resistance and impact resistance.

DISCLOSURE

Technical Problem

The present invention is directed to providing a method of preparing a graft copolymer powder having improved weather resistance, improved surface gloss and improved appearance quality while maintaining basic properties of a graft copolymer powder.

Technical Solution

One aspect of the present invention provides a method of preparing a graft copolymer powder, which includes: preparing a seed by adding one or more selected from the group consisting of an alkyl (meth)acrylate-based monomer, an aromatic vinyl-based monomer and a vinyl cyan-based monomer to a reactor and carrying out polymerization; preparing a core in the presence of the seed by adding an alkyl (meth)acrylate-based monomer and carrying out polymerization; and preparing a graft copolymer latex in the presence of the core by adding an aromatic vinyl-based monomer and a vinyl cyan-based monomer and carrying out polymerization; adding an alkyl methacrylate-based polymer to the graft copolymer latex and carrying out coagulation.

Another aspect of the present invention provides a thermoplastic resin composition, which includes: a first graft copolymer powder prepared by the above-described preparation method; and a matrix copolymer including an aromatic vinyl-based monomer unit and a vinyl cyan-based monomer unit.

Still another aspect of the present invention includes a thermoplastic resin molded article, which is formed of the above-described thermoplastic resin composition and has an $\Delta E$, which is represented by the following equation, of 3 or less:

$$\Delta E = \sqrt{(L'-L_0)^2 + (a'-a_0)^2 + (b'-b_0)^2}$$

In the above equation, $L'$ is an L value measured in the CIE LAB color coordinate system after irradiating a thermoplastic resin molded article with light under SAE J1960 conditions for 6,000 hours, $L_0$ is an L value measured in the CIE LAB color coordinate system before the light irradiation, $a'$ is an a value measured in the CIE LAB color coordinate system after irradiating the thermoplastic resin molded article with light under SAE J1960 conditions for 6,000 hours, $a_0$ is an a value measured in the CIE LAB color coordinate system before the light irradiation, and $b'$ is a b value measured in the CIE LAB color coordinate system after irradiating the thermoplastic resin molded article with light under SAE J1960 conditions for 6,000 hours, and $b_0$ is a b value measured in the CIE LAB color coordinate system before the light irradiation.

Advantageous Effects

According to the method of preparing a graft copolymer powder of the present invention, it is possible to provide a graft copolymer having remarkably improved weather resistance, remarkably improved surface gloss and remarkably improved appearance quality while maintaining basic properties such as impact resistance and the like.

BEST MODE

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, the weight-average molecular weight of an alkyl methacrylate-based polymer may be measured as a relative value with respect to a standard polystyrene (PS) sample by gel permeation chromatography (GPC; Waters Breeze), using tetrahydrofuran (THF) as an eluent.

In the present invention, the glass transition temperatures of an alkyl (meth)acrylate-based crosslinked polymer and an alkyl methacrylate-based polymer may be measured by differential scanning calorimetry.

In the present invention, the average particle diameters of a seed, a core and a graft copolymer may be measured by a dynamic light scattering method, more specifically using a Nicomp 380 instrument (manufactured by PSS).

In the present specification, an average particle diameter may refer to an arithmetic average particle diameter in the particle size distribution as measured by a dynamic light scattering method, that is, an average particle diameter in the scattering intensity distribution.

In the present invention, the ΔE value may be determined by carrying out a test under SAE J1960 conditions for 6,000 hours using an accelerated weather resistance testing instrument (Ci4000 Weather-Ometer manufactured by ATLAS, xenon-arc lamp, quartz (inner)/S.Boro (outer) filter, irradiance: 0.55 W/m² at 340 nm).

In the following equation, ΔE is an arithmetic average value obtained before and after the accelerated weather resistance test, and values closer to 0 indicate better weather resistance.

$$\Delta E = \sqrt{(L'-L_0)^2+(a'-a_0)^2+(b'-b_0)^2}$$

In the above equation, L' is an L value measured in the CIE LAB color coordinate system after irradiating a thermoplastic resin molded article with light under SAE J1960 conditions for 6,000 hours, $L_0$ is an L value measured in the CIE LAB color coordinate system before the light irradiation, a' is an a value measured in the CIE LAB color coordinate system after irradiating the thermoplastic resin molded article with light under SAE J1960 conditions for 6,000 hours, $a_0$ is an a value measured in the CIE LAB color coordinate system before the light irradiation, and b' is a b value measured in the CIE LAB color coordinate system after irradiating the thermoplastic resin molded article with light under SAE J1960 conditions for 6,000 hours, and $b_0$ is a b value measured in the CIE LAB color coordinate system before the light irradiation.

In the present invention, "a (the) total weight of monomers added in the method of preparing a graft copolymer powder" may refer to "a (the) total weight of an alkyl (meth)acrylate-based monomer, an aromatic vinyl-based monomer and a vinyl cyan-based monomer added in the preparation of a seed, a core and a graft copolymer latex."

1. Method of Preparing Graft Copolymer Powder

The method of preparing a graft copolymer powder according to one embodiment of the present invention includes the steps of: 1) preparing a seed by adding one or more selected from the group consisting of an alkyl (meth) acrylate-based monomer, an aromatic vinyl-based monomer and a vinyl cyan-based monomer to a reactor and carrying out polymerization; 2) preparing a core in the presence of the seed by adding an alkyl (meth)acrylate-based monomer and carrying out polymerization; 3) preparing a graft copolymer latex in the presence of the core by adding an aromatic vinyl-based monomer and a vinyl cyan-based monomer and carrying out polymerization; and 4) adding an alkyl methacrylate-based polymer to the graft copolymer latex and carrying out coagulation.

Hereinafter, the steps 1) to 4) included in the method of preparing a graft copolymer powder according to one embodiment of the present invention will be described in detail.

Step 1): Preparation of Seed

First, a seed is prepared by adding one or more selected from the group consisting of an alkyl (meth)acrylate-based monomer, an aromatic vinyl-based monomer and a vinyl cyan-based monomer to a reactor and carrying out polymerization.

In order to prepare a seed having a small average particle diameter in a short time, it is preferable to add an alkyl (meth)acrylate-based monomer alone and carry out polymerization, and in order to prepare a seed having a large average particle diameter, it is preferable to add an aromatic vinyl-based monomer and a vinyl cyan-based monomer and carry out polymerization.

The alkyl (meth)acrylate-based monomer is not particularly limited as long as it allows for the preparation of an alkyl (meth)acrylate-based crosslinked polymer having a glass transition temperature of −20° C. or less, −70° C. to −20° C. or −50° C. to −25° C., that is, alkyl (meth)acrylate-based rubber, through a crosslinking reaction.

When the alkyl (meth)acrylate-based crosslinked polymer satisfies the above-described glass transition temperature, excellent elasticity and excellent mechanical properties can be maintained even in harsh environments. When the above-described range is not satisfied, mechanical properties may not be sufficiently secured.

The alkyl (meth)acrylate-based monomer may be a $C_4$-$C_{10}$ alkyl (meth)acrylate-based monomer, and is preferably a $C_4$-$C_8$ alkyl (meth)acrylate-based monomer.

The alkyl (meth)acrylate-based monomer may be one or more selected from the group consisting of butyl (meth) acrylate, pentyl (meth)acrylate, hexyl (meth)acrylate, heptyl (meth)acrylate, octyl (meth)acrylate, 2-ethylhexyl (meth) acrylate, nonyl (meth)acrylate, isononyl (meth)acrylate and decyl (meth)acrylate, and is more preferably butyl acrylate.

The aromatic vinyl-based monomer may be one or more selected from the group consisting of styrene, α-methylstyrene, α-ethylstyrene and p-methylstyrene, and is preferably styrene.

The vinyl cyan-based monomer may be one or more selected from among acrylonitrile, methacrylonitrile, phenyl acrylonitrile, α-chloroacrylonitrile and ethacrylonitrile, and is preferably acrylonitrile.

The monomers added in the step 1) may be added in a total amount of 1 to 20 wt % or 3 to 15 wt % based on a total weight of the monomers added in the method of preparing a graft copolymer powder, and it is preferred that the monomers are added in a total amount of 3 to 15 wt %. When the above-described range is satisfied, a graft copolymer in which weather resistance, fluidity, impact resistance, chemical resistance, colorability and the like are well balanced can be prepared.

The seed may have an average particle diameter of 20 to 80 nm or 25 to 50 nm, with the range of 25 to 50 nm being preferred. When the above-described range is satisfied, a graft copolymer that exhibits excellent stability during polymerization and is excellent in weather resistance and impact resistance can be prepared.

The polymerization may be emulsion polymerization. The polymerization may be carried out at 55 to 85° C. or 60 to 80° C., and is preferably carried out at 60 to 80° C. When the above-described range is satisfied, the emulsion polymerization can be stably carried out.

In the step 1), one or more selected from the group consisting of an initiator, an emulsifier, a crosslinking agent, a grafting agent, an electrolyte and water may be further added to the reactor.

The initiator may be a radical initiator. The initiator may be one or more selected from the group consisting of: inorganic peroxides such as sodium persulfate, potassium persulfate, ammonium persulfate, potassium perphosphate, hydrogen peroxide and the like; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butylperoxy isobutyrate and the like; azobis(isobutyronitrile), azobis-2,4-dimethylvaleronitrile, azobis(cyclohexanecarbonitrile) and azobis(methyl isobutyrate), and is preferably an inorganic peroxide and more preferably potassium persulfate.

The initiator may be added in an amount of 0.01 to 3 parts by weight or 0.02 to 2.5 parts by weight based on 100 parts by weight of the sum of the monomers added in the method of preparing a graft copolymer powder, and is preferably added in an amount of 0.02 to 2.5 parts by weight. When the above-described range is satisfied, polymerization can be easily carried out.

The emulsifier may be one or more selected from the group consisting of an alkyl sulfosuccinic acid metal salt, an alkyl sulfuric acid ester metal salt, a rosin acid metal salt and a dimer acid metal salt, and is preferably an alkyl sulfuric acid ester metal salt and more preferably sodium dodecyl sulfate.

The alkyl sulfosuccinic acid metal salt may be one or more selected from the group consisting of sodium dicyclohexyl sulfosuccinate, sodium dihexyl, sulfosuccinate, sodium di-2-ethylhexyl sulfosuccinate and potassium di-2-ethylhexyl sulfosuccinate.

The alkyl sulfuric acid ester metal salt may be one or more selected from the group consisting of sodium dodecyl sulfate, sodium dodecylbenzene sulfate, sodium octadecyl sulfate, sodium oleic sulfate, potassium dodecyl sulfate and potassium octadecyl sulfate.

The rosin acid metal salt may be one or more selected from the group consisting of potassium rosinate and sodium rosinate.

The emulsifier may be added in an amount of 0.01 to 5 parts by weight or 0.05 to 4.5 parts by weight based on 100 parts by weight of the sum of the monomers added in the method of preparing a graft copolymer powder, and is preferably added in an amount of 0.05 to 4.5 parts by weight. When the above-described range is satisfied, a seed, specifically a seed latex, that has a desired average particle diameter can be easily formed.

The crosslinking agent may be one or more selected from the group consisting of ethylene glycol di(meth)acrylate, polyethylene glycol di(meth)acrylate, polypropylene glycol di(meth)acrylate, divinylbenzene, diethylene glycol di(meth)acrylate, triethylene glycol di(meth)acrylate, 1,3-butadiol dimethacrylate, hexanediol ethoxylate diacrylate, hexanediol propoxylate di(meth)acrylate, neopentyl glycol dimethacrylate, neopentyl glycol ethoxylate di(meth)acrylate, neopentyl glycol propoxylate di(meth)acrylate, trimethylolmethane tri(meth)acrylate, trimethylolpropane tri(meth)acrylate, trimethylpropane ethoxylate tri(meth)acrylate, trimethylpropane propoxylate tri(meth)acrylate, pentaerythritol ethoxylate tri(meth)acrylate, pentaerythritol propoxylate tri(meth)acrylate and vinyltrimethoxysilane, and is preferably ethylene glycol dimethacrylate.

The crosslinking agent may be added in an amount of 0.01 to 1 part by weight or 0.02 to 0.8 part by weight based on 100 parts by weight of the sum of the monomers added in the method of preparing a graft copolymer powder, and is preferably added in an amount of 0.02 to 0.8 part by weight. When the above-described range is satisfied, since some of the monomers added in the step 1) are crosslinked to form a crosslinked product and the remainder is graft-copolymerized to the crosslinked product, a seed having a desired average particle diameter can be formed.

The grafting agent may be one or more selected from the group consisting of allyl methacrylate, triallyl isocyanurate, diallylamine and triallylamine, and is preferably allyl methacrylate.

The grafting agent may be added in an amount of 0.001 to 3.0 parts by weight or 0.005 to 2.5 parts by weight based on 100 parts by weight of the sum of the monomers added in the method of preparing a graft copolymer powder, and is most preferably added in an amount of 0.005 to 2.5 parts by weight. When the above-described range is satisfied, since some of the monomers added in the step 1) are crosslinked to form a crosslinked product and the remainder is graft-copolymerized to the crosslinked product, a seed having a desired average particle diameter can be formed.

The electrolyte may be one or more selected from the group consisting of KCl, NaCl, $KHCO_3$, $NaHCO_3$, $K_2CO_3$, $Na_2CO_3$, $KHSO_3$, $NaHSO_4$, $Na_2S_2O_7$, $K_4P_2O_7$, $K_3PO_4$ and $Na_3PO_4$ $Na_2HPO_4$, KOH and NaOH, and is preferably KOH.

The electrolyte may be added in an amount of 0.001 to 1 part by weight or 0.01 to 0.8 part by weight based on 100 parts by weight of the sum of the monomers added in the method of preparing a graft copolymer powder, and is preferably added in an amount of 0.01 to 0.8 part by weight. When the above-described range is satisfied, a seed, specifically a seed latex, that has a small average particle diameter can be stably obtained.

The water may be distilled water or ion-exchanged water.

Step 2): Preparation of Core

Subsequently, a core is prepared in the presence of the seed by adding an alkyl (meth)acrylate-based monomer and carrying out polymerization.

Types of the alkyl (meth)acrylate-based monomer have been described above, and among those listed, butyl acrylate is preferred.

The alkyl (meth)acrylate-based monomer may be added in an amount of 25 to 55 wt % or 30 to 50 wt % based on the total weight of the monomers added in the method of preparing a graft copolymer powder, and is preferably added in an amount of 30 to 50 wt %. When the above-described range is satisfied, a graft copolymer in which weather resistance, fluidity and chemical resistance are well balanced can be prepared.

The alkyl (meth)acrylate-based monomer may be continuously added at a constant rate, in which case, heat can be controlled and a runaway reaction caused by the excessive release of heat can be easily suppressed during polymerization.

The polymerization may be emulsion polymerization. The polymerization may be carried out at 55 to 85° C. or 60 to 80° C., and is preferably carried out at 60 to 80° C. When the above-described range is satisfied, the emulsion polymerization can be stably carried out.

The core may have an average particle diameter that is larger than that of the seed. The core may have an average particle diameter of 40 to 120 nm or 50 to 80 nm, with the range of 50 to 80 nm being preferred. When the above-described range is satisfied, a graft copolymer that exhibits excellent stability during polymerization and is excellent in weather resistance, colorability and impact strength can be prepared.

In the step 2), one or more selected from the group consisting of an initiator, an emulsifier, a crosslinking agent, a grafting agent and water may be further added, and, in order to control heat and to easily suppress a runaway reaction caused by the excessive release of heat during polymerization, the addition may be continuously carried out at a constant rate along with the addition of the $C_4$-$C_{10}$ alkyl (meth)acrylate-based monomer.

Types of the initiator have been described above, and among those listed, an inorganic peroxide is preferred, and potassium persulfate is more preferred.

The initiator may be added in an amount of 0.01 to 3 parts by weight or 0.02 to 2.5 parts by weight based on 100 parts by weight of the sum of the monomers added in the method of preparing a graft copolymer powder, and is preferably added in an amount of 0.02 to 2.5 parts by weight. When the above-described range is satisfied, polymerization can be easily carried out.

Types of the emulsifier have been described above, and among those listed, an alkyl sulfuric acid ester metal salt is preferably used, and sodium dodecyl sulfate is more preferably used.

The emulsifier may be added in an amount of 0.01 to 5 parts by weight or 0.05 to 4.5 parts by weight based on 100 parts by weight of the sum of the monomers added in the method of preparing a graft copolymer powder, and is preferably added in an amount of 0.05 to 4.5 parts by weight. When the above-described range is satisfied, a core having a desired average particle diameter can be easily formed.

Types of the crosslinking agent have been described above, and among those listed, ethylene glycol dimethacrylate is preferred.

The crosslinking agent may be added in an amount of 0.01 to 1 part by weight or 0.02 to 0.8 part by weight based on 100 parts by weight of the sum of the monomers added in the method of preparing a graft copolymer powder, and is preferably added in an amount of 0.02 to 0.8 part by weight. When the above-described range is satisfied, since some of the monomers added in the step 2) are crosslinked with the seed to form a crosslinked product and the remainder is graft-copolymerized to the crosslinked product, a core having a desired average particle diameter can be formed.

Types of the grafting agent have been described above, and among those listed, allyl methacrylate is preferred.

The grafting agent may be added in an amount of 0.01 to 3.0 parts by weight or 0.02 to 2.5 parts by weight based on 100 parts by weight of the sum of the monomers added in the method of preparing a graft copolymer powder, and is most preferably added in an amount of 0.02 to 2.5 parts by weight. When the above-described range is satisfied, since some of the monomers added in the step 2) are crosslinked with the seed to form a crosslinked product and the remainder is graft-copolymerized to the crosslinked product, a core having a desired average particle diameter can be formed.

The water may be distilled water or ion-exchanged water.

Step 3): Preparation of Latex

Subsequently, a graft copolymer latex is prepared in the presence of the core by adding an aromatic vinyl-based monomer and a vinyl cyan-based monomer and carrying out polymerization.

Types of the aromatic vinyl-based monomer and the vinyl cyan-based monomer have been described above.

The aromatic vinyl-based monomer and the vinyl cyan-based monomer may be added in a total amount of 40 to 60 wt % or 45 to 55 wt % based on the total weight of the monomers added in the method of preparing a graft copolymer powder, and are preferably added in a total amount of 45 to 55 wt %. When the above-described range is satisfied, a graft copolymer in which weather resistance, fluidity and chemical resistance are well balanced can be prepared.

The aromatic vinyl-based monomer and the vinyl cyan-based monomer may be added in a weight ratio of 65:35 to 85:15 or 70:30 to 80:20, and are preferably added in a weight ratio of 70:30 to 80:20. When the above-described range is satisfied, there is the advantage that a balance between the fluidity and chemical resistance of the graft copolymer powder is excellent.

The aromatic vinyl-based monomer and the vinyl cyan-based monomer may be continuously added at a constant rate, in which case, heat can be controlled and a runaway reaction caused by the excessive release of heat can be easily suppressed during polymerization.

The polymerization may be emulsion polymerization. The polymerization may be carried out at 50 to 85° C. or 60 to 80° C., and is preferably carried out at 60 to 80° C. When the above-described range is satisfied, the emulsion polymerization can be stably carried out.

The graft copolymer may have an average particle diameter that is larger than that of the core. The graft copolymer may have an average particle diameter of 60 to 150 nm or 65 to 105 nm, with the range of 65 to 105 nm being preferred. When the above-described range is satisfied, a graft copolymer that exhibits excellent stability during polymerization and is excellent in weather resistance and impact strength can be prepared.

In the step 3), one or more selected from the group consisting of an initiator, an activator, an emulsifier, a molecular-weight regulator and water may be further added, and the addition may be continuously carried out at a constant rate along with the addition of an aromatic vinyl-based monomer and a vinyl cyan-based monomer.

Types of the initiator have been described above, and among those listed, an organic peroxide is preferred, and cumene hydroperoxide is more preferred.

The initiator may be added in an amount of 0.01 to 3 parts by weight or 0.02 to 2.5 parts by weight based on 100 parts by weight of the sum of the monomers added in the method of preparing a graft copolymer powder, and is preferably added in an amount of 0.02 to 2.5 parts by weight. When the above-described range is satisfied, polymerization can be easily carried out.

The activator may be one or more selected from the group consisting of sodium formaldehyde sulfoxylate, sodium ethylenediaminetetraacetate, ferrous sulfate, dextrose, sodium pyrophosphate, anhydrous sodium pyrophosphate and sodium sulfate, and is preferably one or more selected from the group consisting of ferrous sulfate, dextrose and sodium pyrophosphate.

The activator may be added in an amount of 0.01 to 1 part by weight or 0.1 to 0.8 part by weight based on 100 parts by weight of the sum of the monomers added in the method of preparing a graft copolymer powder, and is preferably added in an amount of 0.1 to 0.8 part by weight. When the above-described content is satisfied, the initiation of polymerization can be promoted.

Types of the emulsifier have been described above, and among those listed, a rosin acid metal salt is preferred, and potassium rosinate is more preferred.

The emulsifier may be added in an amount of 0.1 to 3 parts by weight or 0.5 to 2.5 parts by weight based on 100 parts by weight of the sum of the monomers added in the method of preparing a graft copolymer powder, and is preferably added in an amount of 0.5 to 2.5 parts by weight. When the above-described range is satisfied, a graft copolymer having a desired average particle diameter can be easily prepared.

The molecular-weight regulator may be: an α-methyl styrene dimer; a mercaptan such as t-dodecyl mercaptan, n-dodecyl mercaptan or n-octyl mercaptan; a halogenated hydrocarbon such as carbon tetrachloride, methylene chloride or methylene bromide; or a sulfur-containing compound such as tetraethylthiuram disulfide, dipentamethylene thiuram disulfide or diisopropyl xanthogen disulfide. Preferably, the molecular-weight regulator is t-dodecyl mercaptan.

The molecular-weight regulator may be added in an amount of 0.001 to 1 part by weight or 0.01 to 0.8 part by weight based on 100 parts by weight of the sum of the monomers added in the method of preparing a graft copolymer powder, and is preferably added in an amount of 0.01 to 0.8 part by weight. When the above-described range is satisfied, since the weight-average molecular weight of the shell can be appropriately maintained, a graft copolymer with improved mechanical properties and improved surface properties can be prepared.

The water may be distilled water or ion-exchanged water.

Step 4): Preparation of Powder

Subsequently, an alkyl methacrylate-based polymer is added to the graft copolymer latex, and coagulation is carried out.

The addition of the alkyl methacrylate-based polymer in step 4) allows weather resistance, surface gloss and appearance quality to be significantly improved without affecting the polymerization of the graft copolymer and accordingly degrading the basic properties (e.g., impact resistance) of the graft copolymer powder.

The addition of the alkyl methacrylate-based polymer in the steps 1) to 3) may degrade the basic properties of the graft copolymer. When the alkyl methacrylate-based polymer is added during compounding, not only impact resistance is significantly reduced, but also the effect of improving weather resistance and appearance quality is not as great as when the alkyl methacrylate-based polymer is added in the step 4).

Meanwhile, it is preferred that the alkyl methacrylate-based polymer is a hard polymer so that excellent surface properties can be realized.

The alkyl methacrylate-based polymer may have a glass transition temperature of 60 to 140° C. or 80 to 130° C., with the range of 80 to 130° C. being preferred. When the above-described range is satisfied, a graft copolymer that is excellent in all of weather resistance, processability and appearance quality can be prepared. Below the above-described range, the appearance quality may be degraded, and above the above-described range, kneading properties during processing may be degraded.

The alkyl methacrylate-based polymer may have a weight-average molecular weight of 30,000 to 2,000,000 g/mol or 40,000 to 1,500,000 g/mol, with the range of 40,000 to 1,500,000 g/mol being preferred. When the above-described range is satisfied, a graft copolymer that is excellent in all of weather resistance, impact resistance and appearance quality can be prepared.

The alkyl methacrylate-based polymer may be one or more selected from the group consisting of poly(methyl methacrylate), poly(ethyl methacrylate), poly(propyl methacrylate), poly(butyl methacrylate), poly(ethylhexyl methacrylate) and poly(decyl methacrylate), and is preferably poly(methyl methacrylate).

The alkyl methacrylate-based polymer is preferably added in an amount of 0.5 to 20 parts by weight or 1 to 15 parts by weight based on 100 parts by weight of the sum of the monomers added in the method of preparing a graft copolymer powder, and is more preferably added in an amount of 1 to 15 parts by weight. When the above-described range is satisfied, weather resistance and appearance quality can be improved while the degradation of impact resistance can be prevented.

Meanwhile, the alkyl methacrylate-based polymer is preferably in the form of latex so that it can be easily mixed with the graft copolymer latex and coagulated with the graft copolymer latex.

The alkyl methacrylate-based polymer in latex form may be prepared through an emulsion polymerization method using an alkyl methacrylate-based monomer, that is, by adding the alkyl methacrylate-based monomer, an initiator, an emulsifier and water and carrying out emulsion polymerization. In this case, the emulsion polymerization may be carried out at 60 to 80° C. or 65 to 75° C., and is preferably carried out at 65 to 75° C.

The alkyl methacrylate-based monomer is not particularly limited as long as it allows for the preparation of an alkyl methacrylate-based polymer having a glass transition temperature of 60 to 140° C. through emulsion polymerization.

The alkyl methacrylate-based monomer may be a $C_1$-$C_{10}$ alkyl methacrylate-based monomer. The $C_1$-$C_{10}$ alkyl methacrylate-based monomer may be one or more selected from the group consisting of methyl methacrylate, ethyl methacrylate, propyl methacrylate, butyl methacrylate, ethylhexyl methacrylate and decyl methacrylate, and is preferably methyl methacrylate.

Types of the initiator have been described above, and among those listed, potassium persulfate is preferred.

The initiator may be added in an amount of 0.1 to 5 parts by weight or 0.5 to 3 parts by weight based on 100 parts by weight of the alkyl methacrylate-based monomers, and is preferably added in an amount of 0.5 to 1.5 parts by weight. When the above-described condition is satisfied, an alkyl methacrylate-based polymer having a desired molecular weight can be prepared.

Types of the emulsifier have been described above, and among those listed, sodium dodecylbenzene sulfate is preferred.

The emulsifier may be added in an amount of 0.1 to 10 parts by weight or 0.5 to 5 parts by weight based on 100 parts by weight of the alkyl methacrylate-based monomers, and is preferably added in an amount of 0.5 to 5 parts by weight. When the above-described condition is satisfied, an alkyl methacrylate-based polymer having a desired molecular weight can be prepared.

During the emulsion polymerization, an electrolyte and a molecular-weight regulator may be further added.

Types of the electrolyte have been described above, and among those listed, $Na_2CO_3$ is preferred.

The electrolyte may be added in an amount of 0.01 to 2 parts by weight or 0.1 to 1 part by weight based on 100 parts by weight of the alkyl methacrylate-based monomers, and is preferably added in an amount of 0.1 to 1 part by weight. When the above-described condition is satisfied, latex stability during polymerization can be ensured.

Types of the molecular-weight regulator have been described above, and among those listed, n-octyl mercaptan is preferred.

The molecular-weight regulator may be added in an amount of 10 parts by weight or less or 0.5 to 3 parts by weight based on 100 parts by weight of the alkyl methacrylate-based monomers, and is preferably added in an amount of 0.5 to 3 parts by weight. When the above-described condition is satisfied, an alkyl methacrylate-based polymer having a desired molecular weight can be prepared.

In the step 4), a stirring process may be additionally carried out so that the graft copolymer and the alkyl methacrylate-based polymer can be well mixed.

In the step 4), a coagulant may be added.

The coagulant may be one or more selected from the group consisting of $H_2SO_4$, $MgSO_4$ and $CaCl_2$), and is preferably $CaCl_2$).

The coagulant may be added in an amount of 0.1 to 5 parts by weight or 0.5 to 3 parts by weight based on 100 parts by weight of the sum of the monomers added in the method of preparing a graft copolymer powder, and is preferably added in an amount of 0.5 to 3 parts by weight. When the above-described range is satisfied, the graft copolymer latex and the alkyl methacrylate-based polymer can be easily coagulated.

The step 4) may be carried out at 75 to 95° C. or 80 to 90° C., and is preferably carried out at 80 to 90° C. When the above-described range is satisfied, the graft copolymer latex and the alkyl methacrylate-based polymer can be easily coagulated.

After the step 4) of the method of preparing a graft copolymer powder according to one embodiment of the present invention is completed, aging, dehydration, washing and drying processes may be additionally carried out to prepare a graft copolymer powder.

2. Thermoplastic Resin Composition

The thermoplastic resin composition according to another embodiment of the present invention includes: a graft copolymer powder prepared according to the above-described method of preparing a graft copolymer powder of the present invention (hereinafter referred to as "first graft copolymer powder" for convenience); and a matrix copolymer including an aromatic vinyl-based monomer unit and a vinyl cyan-based monomer unit.

The aromatic vinyl-based monomer unit included in the matrix copolymer may be a unit derived from one or more selected from the group consisting of styrene, α-methylstyrene, α-ethylstyrene and p-methylstyrene, and is preferably a unit derived from α-methylstyrene.

The vinyl cyan-based monomer unit included in the matrix copolymer may be a unit derived from one or more selected from among acrylonitrile, methacrylonitrile, phenyl acrylonitrile, α-chloroacrylonitrile and ethacrylonitrile, and is preferably a unit derived from acrylonitrile.

The matrix copolymer may include the aromatic vinyl-based monomer unit and the vinyl cyan-based monomer unit in a weight ratio of 60:40 to 80:20 or 65:35 to 75:25, with the range of 65:35 to 75:25 being preferred. When the above-described contents are satisfied, a thermoplastic resin composition that is excellent in all of heat resistance, fluidity and chemical resistance can be provided.

The thermoplastic resin composition may contain the graft copolymer powder (i.e., first graft copolymer powder) and the matrix copolymer in a weight ratio of 60:40 to 10:90 or 55:45 to 10:85, with the range of 55:45 to 10:85 being preferred. When the above-described range is satisfied, a thermoplastic resin composition that is excellent in all of weather resistance, heat resistance, fluidity, chemical resistance and appearance characteristics can be prepared.

In order to further improve impact resistance, the thermoplastic resin composition may further contain another graft copolymer powder (hereinafter referred to as "second graft copolymer powder" for convenience) in addition to the graft copolymer powder prepared by the above-described method of the present invention.

The second graft copolymer powder is prepared without carrying out an operation of adding an alkyl methacrylate-based polymer, and is different in composition from the first graft copolymer powder, which includes an alkyl methacrylate-based polymer.

Specifically, the second graft copolymer powder is a graft copolymer in which an aromatic vinyl-based monomer and a vinyl cyan-based monomer are graft-polymerized to an acrylic rubber polymer.

The acrylic rubber polymer may be: a polymer of an alkyl (meth)acrylate-based monomer; or a polymer of a mixture of an alkyl (meth)acrylate-based monomer and at least one of an aromatic vinyl-based monomer and a vinyl cyan-based monomer.

Types of the alkyl (meth)acrylate-based monomer, the aromatic vinyl-based monomer and the vinyl cyan-based monomer used in the preparation of a second graft copolymer powder have been described above.

Meanwhile, it is preferred that the acrylic rubber polymer which forms a core of the second graft copolymer has an average particle diameter of about 300 to 450 nm.

The above-described second graft copolymer powder may be selected from among commercially available acrylic rubber graft copolymers, or may be prepared through the above-described steps 1) to 3). In this case, the step 4), that is, the step of carrying out coagulation with an alkyl methacrylate-based polymer is not carried out.

The thermoplastic resin composition may include: the first graft copolymer at 30 to 50 wt %; the second graft copolymer at 1 to 10 wt %; and the matrix copolymer at 45 to 65 wt % based on a total weight of the thermoplastic resin composition, and preferably contains: the first graft copolymer at 35 to 45 wt %; the second graft copolymer at 2 to 7 wt %; and the matrix copolymer at 50 to 60 wt %. When the above-described range is satisfied, a thermoplastic resin composition that is excellent in all of weather resistance, impact resistance and appearance quality can be provided.

The thermoplastic resin composition may further contain an additive such as a dye, a pigment, a lubricant, an antioxidant, a UV stabilizer, a thermal stabilizer, a reinforcing agent, a filler, a flame retardant, a foaming agent, a plasticizer, a matting agent or the like depending on the area of application.

3. Thermoplastic Resin Molded Article

The thermoplastic resin molded article according to still another embodiment of the present invention may be formed of the thermoplastic resin composition according to another embodiment of the present invention, and may have an ΔE, which is represented by the following equation, of 3 or less and preferably 2.4 or less:

$$\Delta E = \sqrt{(L'-L_0)^2 + (a'-a_0)^2 + (b'-b_0)^2}$$

In the above equation, L' is an L value measured in the CIE LAB color coordinate system after irradiating a thermoplastic resin molded article with light under SAE J1960 conditions for 6,000 hours, $L_0$ is an L value measured in the CIE LAB color coordinate system before the light irradiation, a' is an a value measured in the CIE LAB color coordinate system after irradiating the thermoplastic resin molded article with light under SAE J1960 conditions for 6,000 hours, $a_0$ is an a value measured in the CIE LAB color coordinate system before the light irradiation, and b' is a b value measured in the CIE LAB color coordinate system after irradiating the thermoplastic resin molded article with light under SAE J1960 conditions for 6,000 hours, and $b_0$ is a b value measured in the CIE LAB color coordinate system before the light irradiation.

When the above-described condition is satisfied, a thermoplastic resin molded article with outstanding weather resistance can be prepared.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

<Preparation of Poly(Methyl Methacrylate)>

Preparation Example 1

To a nitrogen-substituted polymerization reactor, 100 parts by weight of methyl methacrylate, 200 parts by weight of distilled water, 5 parts by weight of sodium dodecylbenzene sulfate as an emulsifier, 0.2 part by weight of $Na_2CO_3$ as an electrolyte, and 2.5 parts by weight of n-octyl mercaptan as a molecular-weight regulator were batch-added. After raising the temperature inside the reactor to 70° C., polymerization was initiated by adding 1.0 part by weight of potassium persulfate. The polymerization was carried out for 60 minutes while maintaining the temperature inside the reactor at 70° C., and thereby a poly(methyl methacrylate) latex having a weight-average molecular weight of 40,000 g/mol and a glass transition temperature of 110° C. was prepared.

Preparation Example 2

A poly(methyl methacrylate) latex having a weight-average molecular weight of 60,000 g/mol and a glass transition temperature of 110° C. was prepared in the same manner as in Preparation Example 1 except that n-octyl mercaptan was added in an amount of 1.5 parts by weight instead of 2.5 parts by weight.

Preparation Example 3

A poly(methyl methacrylate) latex having a weight-average molecular weight of 100,000 g/mol and a glass transition temperature of 110° C. was prepared in the same manner as in Preparation Example 1 except that n-octyl mercaptan was added in an amount of 0.1 part by weight instead of 2.5 parts by weight.

Preparation Example 4

A poly(methyl methacrylate) latex having a weight-average molecular weight of 1,000,000 g/mol and a glass transition temperature of 110° C. was prepared in the same manner as in Preparation Example 1 except that n-octyl mercaptan was not added.

Example 1

<Preparation of Seed>
To a nitrogen-substituted polymerization reactor, 6.5 parts by weight of butyl acrylate, 1.5 parts by weight of sodium dodecyl sulfate as an emulsifier, 0.04 part by weight of ethylene glycol dimethacrylate as a crosslinking agent, 0.015 part by weight of allyl methacrylate as a grafting agent, 0.1 part by weight of KOH as an electrolyte, and 60 parts by weight of distilled water were batch-added. After raising the temperature to 70° C., a reaction was initiated by batch-adding 0.04 part by weight of potassium persulfate as an initiator. After continuing for one hour, the polymerization was terminated, and thereby a seed (average particle diameter: 34 nm) was obtained.

<Preparation of Core>
Polymerization was carried out while continuously adding, to the seed-containing reactor at 70° C. for two hours at a constant rate, a mixture including 43.5 parts by weight of butyl acrylate, 0.7 part by weight of sodium dodecyl sulfate as an emulsifier, 0.25 part by weight of ethylene glycol dimethacrylate as a crosslinking agent, 0.09 part by weight of allyl methacrylate as a grafting agent, 35 parts by weight of distilled water, and 0.03 part by weight of potassium persulfate as an initiator. After the addition was completed, the polymerization was continued for another hour and then was terminated, and thereby a core (average particle diameter: 65 nm) was obtained.

<Preparation of Graft Copolymer Latex>
Polymerization was carried out while continuously adding, to the core-containing reactor at 75° C. for 2.5 hours at a constant rate, each one of a first mixture including 23 parts by weight of distilled water, 38 parts by weight of styrene, 12 parts by weight of acrylonitrile, 1.8 parts by weight of potassium rosinate as an emulsifier, 0.1 part by weight of t-dodecyl mercaptan as a molecular-weight regulator, and 0.05 part by weight of cumene hydroperoxide as an initiator and a second mixture including 0.09 part by weight of sodium pyrophosphate, 0.12 part by weight of dextrose, and 0.002 part by weight of ferrous sulfate as activators. After the continuous addition was completed, the polymerization reaction was continued at 75° C. for another hour and then was terminated by lowering the temperature to 60° C., and thereby a graft copolymer latex (average particle diameter: 85 nm) was obtained.

<Preparation of Graft Copolymer Powder>
After a mixture was prepared by adding 5 parts by weight (based on a solid content) of the poly(methyl methacrylate) latex of Preparation Example 1 to the graft copolymer latex and performing stirring, the mixture was added to an aqueous calcium chloride solution (500 parts by weight of distilled water and 1 part by weight of calcium chloride) at atmospheric pressure at 85° C. for 10 minutes so that co-coagulation thereof was carried out. After the mixture was subsequently aged at 95° C. for five minutes, dehydrated, washed, and dried with 90° C. hot air for 30 minutes, a graft copolymer powder A was obtained.

<Preparation of Thermoplastic Resin Composition>
A thermoplastic resin composition A was prepared by mixing 40 parts by weight of the graft copolymer powder A prepared as described above as a first graft copolymer powder, 4 parts by weight of SA927 (manufactured by LG Chem Ltd.) as a second graft copolymer powder, and 56 parts by weight of 100 UH (manufactured by LG Chem Ltd.) as a matrix copolymer.

Example 2

A graft copolymer powder B was prepared in the same manner as in Example 1 except that 3 parts by weight (based on a solid content) of the poly(methyl methacrylate) latex of Preparation Example 2 was added instead of 5 parts by weight of the poly(methyl methacrylate) latex of Preparation Example 1.

In addition, a thermoplastic resin composition B was prepared in the same manner as in Example 1 except that the graft copolymer powder B was used instead of the graft copolymer powder A.

Example 3

A graft copolymer powder C was prepared in the same manner as in Example 1 except that 5 parts by weight (based on a solid content) of the poly(methyl methacrylate) latex of Preparation Example 2 was added instead of 5 parts by weight of the poly(methyl methacrylate) latex of Preparation Example 1.

In addition, a thermoplastic resin composition C was prepared in the same manner as in Example 1 except that the graft copolymer powder C was used instead of the graft copolymer powder A.

Example 4

A graft copolymer powder D was prepared in the same manner as in Example 1 except that 10 parts by weight (based on a solid content) of the poly(methyl methacrylate) latex of Preparation Example 2 was added instead of 5 parts by weight of the poly(methyl methacrylate) latex of Preparation Example 1.

In addition, a thermoplastic resin composition D was prepared in the same manner as in Example 1 except that the graft copolymer powder D was used instead of the graft copolymer powder A.

Example 5

A graft copolymer powder E was prepared in the same manner as in Example 1 except that 5 parts by weight (based on a solid content) of the poly(methyl methacrylate) latex of Preparation Example 3 was added instead of 5 parts by weight of the poly(methyl methacrylate) latex of Preparation Example 1.

In addition, a thermoplastic resin composition E was prepared in the same manner as in Example 1 except that the graft copolymer powder E was used instead of the graft copolymer powder A.

Example 6

A graft copolymer powder F was prepared in the same manner as in Example 1 except that 5 parts by weight (based on a solid content) of the poly(methyl methacrylate) latex of Preparation Example 4 was added instead of 5 parts by weight of the poly(methyl methacrylate) latex of Preparation Example 1.

In addition, a thermoplastic resin composition F was prepared in the same manner as in Example 1 except that the graft copolymer powder F was used instead of the graft copolymer powder A.

Comparative Example 1

<Preparation of Seed>

To a nitrogen-substituted polymerization reactor, 6.5 parts by weight of butyl acrylate, 1.5 parts by weight of sodium dodecyl sulfate as an emulsifier, 0.04 part by weight of ethylene glycol dimethacrylate as a crosslinking agent, 0.015 part by weight of allyl methacrylate as a grafting agent, 0.1 part by weight of KOH as an electrolyte, and 60 parts by weight of distilled water were batch-added. After raising the temperature to 70° C., a reaction was initiated by batch-adding 0.04 part by weight of potassium persulfate as an initiator. After continuing for one hour, the polymerization was terminated, and thereby a seed (average particle diameter: 34 nm) was obtained.

<Preparation of Core>

Polymerization was carried out while continuously adding, to the seed-containing reactor at 70° C. for two hours at a constant rate, a mixture including 43.5 parts by weight of butyl acrylate, 0.7 part by weight of sodium dodecyl sulfate as an emulsifier, 0.25 part by weight of ethylene glycol dimethacrylate as a crosslinking agent, 0.09 part by weight of allyl methacrylate as a grafting agent, 35 parts by weight of distilled water, and 0.03 part by weight of potassium persulfate as an initiator. After the addition was completed, the polymerization was continued for another hour and then was terminated, and thereby a core (average particle diameter: 65 nm) was obtained.

<Preparation of Graft Copolymer Latex>

Polymerization was carried out while continuously adding, to the core-containing reactor at 75° C. for 2.5 hours at a constant rate, each one of a first mixture including 23 parts by weight of distilled water, 38 parts by weight of styrene, 12 parts by weight of acrylonitrile, 1.8 parts by weight of potassium rosinate as an emulsifier, 0.1 part by weight of t-dodecyl mercaptan as a molecular-weight regulator, and 0.05 part by weight of cumene hydroperoxide as an initiator and a second mixture including 0.09 part by weight of sodium pyrophosphate, 0.12 part by weight of dextrose, and 0.002 part by weight of ferrous sulfate as activators. After the continuous addition was completed, the polymerization reaction was continued at 75° C. for another hour and then was terminated by lowering the temperature to 60° C., and thereby a graft copolymer latex (average particle diameter: 85 nm) was obtained.

<Preparation of Graft Copolymer Powder>

The graft copolymer latex prepared as described above was added to an aqueous calcium chloride solution (500 parts by weight of distilled water and 1 part by weight of calcium chloride) at atmospheric pressure at 85° C. for 10 minutes so that coagulation thereof was induced. After the mixture was subsequently aged at 95° C. for five minutes, dehydrated, washed, and dried with 90° C. hot air for 30 minutes, a graft copolymer powder G was obtained.

<Preparation of Thermoplastic Resin Composition>

A thermoplastic resin composition G was prepared by mixing 40 parts by weight of the graft copolymer powder G prepared as described above as a first graft copolymer powder, 4 parts by weight of SA927 (manufactured by LG Chem Ltd.) as a second graft copolymer powder, and 56 parts by weight of 100 UH (manufactured by LG Chem Ltd.) as a matrix copolymer.

Comparative Example 2

A graft copolymer powder H was prepared in the same manner as in Comparative Example 1 except that 35 parts by weight of styrene, 12 parts by weight of acrylonitrile, and 3 parts by weight of methyl methacrylate were added instead of 38 parts by weight of styrene and 12 parts by weight of acrylonitrile in the preparation of a graft copolymer latex.

In addition, a thermoplastic resin composition H was prepared in the same manner as in Comparative Example 1 except that the graft copolymer powder H was used instead of the graft copolymer powder G.

Comparative Example 3

A thermoplastic resin composition I was prepared by mixing 40 parts by weight of the graft copolymer powder G prepared in Comparative Example 1 as a first graft copolymer powder, 4 parts by weight of SA927 (manufactured by LG Chem Ltd.) as a second graft copolymer powder, and a mixture of 53 parts by weight of 100 UH (manufactured by LG Chem Ltd.) and 3 parts by weight of poly(methyl methacrylate) (BA611 grade; manufactured by LG MMA) as a matrix copolymer.

Comparative Example 4

A thermoplastic resin composition J was prepared by mixing 40 parts by weight of the graft copolymer powder G prepared in Comparative Example 1 as a first graft copolymer powder, 4 parts by weight of SA927 (manufactured by LG Chem Ltd.) as a second graft copolymer powder, and a mixture of 53 parts by weight of 100 UH (manufactured by LG Chem Ltd.) and 3 parts by weight of poly(methyl methacrylate) (IH830; manufactured by LG MMA) as a matrix copolymer.

Meanwhile, Table 1 below describes the compositions of the shells of the graft copolymers A to H and the specifications and amounts of the alkyl methacrylate-based polymers used for preparation.

TABLE 1

| Classifi-cation | Monomers added for shell formation (parts by weight) | | | Poly(methyl methacrylate) | |
|---|---|---|---|---|---|
| | Styrene | Acrylonitrile | Methyl methacrylate | Weight-average molecular weight (g/mol) | Amount (parts by weight) |
| A | 38 | 12 | — | 40,000 | 5 |
| B | 38 | 12 | — | 60,000 | 3 |
| C | 38 | 12 | — | 60,000 | 5 |
| D | 38 | 12 | — | 60,000 | 10 |
| E | 38 | 12 | — | 100,000 | 5 |
| F | 38 | 12 | — | 1,000,000 | 5 |
| G | 38 | 12 | — | — | — |
| H | 35 | 12 | 3 | — | — |

Experimental Example 1

After 100 parts by weight of each of the thermoplastic resin compositions of Examples and Comparative Examples was uniformly mixed with 1.5 parts by weight of a lubricant, 1.0 part by weight of an antioxidant, and 1.0 part by weight of a UV stabilizer, the mixture was formed into pellets using a 36-phi extrusion kneading machine at 220° C. and then was injected to form test specimens. The properties of the test specimens were evaluated by the methods described below, and the results are shown in Table 2.

① Weather resistance (ΔE): evaluated under SAE J1960 conditions for 6,000 hours using an accelerated weather resistance testing instrument (Ci4000 Weather-Ometer manufactured by ATLAS, xenon-arc lamp, quartz (inner)/S.Boro (outer) filter, irradiance: 0.55 W/m² at 340 nm). In the following equation, ΔE is an arithmetic average value obtained before and after the accelerated weather resistance test, and values closer to 0 indicate better weather resistance.

$$\Delta E = \sqrt{(L'-L_0)^2 + (a'-a_0)^2 + (b'-b_0)^2}$$

In the above equation, L' is an L value measured in the CIE LAB color coordinate system after irradiating a thermoplastic resin molded article with light under SAE J1960 conditions for 6,000 hours, $L_0$ is an L value measured in the CIE LAB color coordinate system before the light irradiation, a' is an a value measured in the CIE LAB color coordinate system after irradiating the thermoplastic resin molded article with light under SAE J1960 conditions for 6,000 hours, $a_0$ is an a value measured in the CIE LAB color coordinate system before the light irradiation, and b' is a b value measured in the CIE LAB color coordinate system after irradiating the thermoplastic resin molded article with light under SAE J1960 conditions for 6,000 hours, and $b_0$ is a b value measured in the CIE LAB color coordinate system before the light irradiation.

② IZOD impact strength (kg·cm/cm): measured in accordance with ASTM 256, by preparing a ¼-inch-thick specimen.

③ Injection gloss (45°): measured in accordance with ASTM D528.

Experimental Example 2

Each of the thermoplastic resin compositions of Examples and Comparative Examples was coextruded with PVC, and the surface properties thereof were evaluated.

Specifically, the PVC layer was melt-kneaded at 170° C. using a 130-phi L/D 20 twin-screw extrusion kneading machine. The thermoplastic resin composition was melt-kneaded at 180° C. using a 60-phi L/D 20 single-screw extrusion kneading machine. The PVC and the thermoplastic resin composition were supplied to a coextrusion die at a weight ratio of 9:1 during the coextrusion, and then were passed through a water-cooled calibrator to prepare a final coextrusion test specimen. The properties of the test specimen were evaluated by the method described below, and the results are shown in Table 2.

Coextrusion gloss: measured by the method described in "3 Injection gloss".

TABLE 2

| Classifi-cation | Thermoplastic resin composition | Weather resist-ance | Impact strength | Injection gloss | Coex-trusion gloss |
|---|---|---|---|---|---|
| Example 1 | A | 1.4 | 14.1 | 100 | 97 |
| Example 2 | B | 2.1 | 15.5 | 92 | 87 |
| Example 3 | C | 1.6 | 14.6 | 97 | 93 |
| Example 4 | D | 1.4 | 13.8 | 99 | 95 |
| Example 5 | E | 1.7 | 14.9 | 93 | 89 |
| Example 6 | F | 1.9 | 15.7 | 89 | 85 |
| Comparative Example 1 | G | 6.0 | 15.9 | 73 | 65 |
| Comparative Example 2 | H | 2.8 | 9.8 | 75 | 64 |
| Comparative Example 3 | I | 3.5 | 10.8 | 82 | 78 |
| Comparative Example 4 | J | 3.8 | 11.5 | 78 | 75 |

Referring to Table 2, in the case of Examples 1, 3, 5 and 6 in which the same amount of a poly(methyl methacrylate) latex was used, it can be seen that as the weight-average molecular weight of the poly(methyl methacrylate) latex was decreased, weather resistance, injection gloss and coextrusion gloss were improved, and that as the weight-average molecular weight of the poly(methyl methacrylate) was increased, impact strength was improved.

In the case of Examples 2 to 4 in which a poly(methyl methacrylate) latex of the same weight-average molecular weight was used, it can be seen that as the addition amount thereof was increased, weather resistance, injection gloss and coextrusion gloss were improved, and that as the addition amount thereof was decreased, impact strength was improved.

In addition, it can be seen that Examples 1 to 6 were excellent in all of weather resistance, injection gloss and coextrusion gloss compared to Comparative Example 1 in which a poly(methyl methacrylate) latex was not used.

In addition, it can be seen that Examples 1 to 6 were excellent in all of weather resistance, impact strength, injection gloss and coextrusion gloss compared to Comparative Example 2 in which a poly(methyl methacrylate) latex was not used and methyl methacrylate was used for shell preparation.

Meanwhile, it can be seen that the degradation in all of weather resistance, impact strength, injection gloss and coextrusion gloss was exhibited in Comparative Examples 3 and 4 in which poly(methyl methacrylate) was added in a compounding process as compared to Examples 1 to 6.

The invention claimed is:

1. A method of preparing a graft copolymer powder, the method comprising:
   preparing a seed by adding one or more selected from the group consisting of an alkyl (meth)acrylate-based monomer, an aromatic vinyl-based monomer and a vinyl cyan-based monomer to a reactor and carrying out polymerization;
   preparing a core in the presence of the seed by adding an alkyl (meth)acrylate-based monomer and carrying out polymerization;
   preparing a graft copolymer latex in the presence of the core by adding an aromatic vinyl-based monomer and a vinyl cyan-based monomer and carrying out polymerization; and
   adding an alkyl methacrylate-based polymer to the graft copolymer latex and carrying out coagulation.

2. The method of claim 1, wherein the alkyl methacrylate-based polymer is added in latex form.

3. The method of claim 2, wherein the alkyl methacrylate-based polymer in latex form is prepared by an emulsion polymerization method.

4. The method of claim 1, wherein the alkyl methacrylate-based polymer has a weight-average molecular weight of 30,000 g/mol to 2,000,000 g/mol.

5. The method of claim 1, wherein the alkyl methacrylate-based polymer has a weight-average molecular weight of 40,000 g/mol to 1,500,000 g/mol.

6. The method of claim 1, wherein the alkyl methacrylate-based polymer has a glass transition temperature of 60° C. to 140° C.

7. The method of claim 1, wherein the alkyl methacrylate-based polymer is one or more selected from the group consisting of poly(methyl methacrylate), poly(ethyl methacrylate), poly(propyl methacrylate), poly(butyl methacrylate), poly(ethylhexyl methacrylate) and poly(decyl methacrylate).

8. The method of claim 1, wherein the alkyl methacrylate-based polymer is added in an amount of 0.5 part by weight to 20 parts by weight based on 100 parts by weight of the sum of the monomers added in the method of preparing the graft copolymer powder.

9. The method of claim 1, wherein the alkyl methacrylate-based polymer is added in an amount of 1 part by weight to 15 parts by weight based on 100 parts by weight of the sum of the monomers added in the method of preparing the graft copolymer powder.

10. The method of claim 1, wherein the core has an average particle diameter of 40 nm to 120 nm.

11. A thermoplastic resin composition, comprising:
    a first graft copolymer powder prepared by the method of claim 1; and
    a matrix copolymer including an aromatic vinyl-based monomer unit and a vinyl cyan-based monomer unit.

12. The thermoplastic resin composition of claim 11, further comprising a second graft copolymer powder in which an aromatic vinyl-based monomer and a vinyl cyan-based monomer are graft-polymerized to an acrylic rubber polymer.

13. A thermoplastic resin molded article formed of the thermoplastic resin composition of claim 11 and having an ΔE, which is represented by the following equation, of 3 or less:

$$\Delta E = \sqrt{(L'-L_0)^2 + (a'-a_0)^2 + (b'-b_0)^2}$$

wherein,
L' is an L value measured in the CIE LAB color coordinate system after irradiating a thermoplastic resin molded article with light under SAE J1960 conditions for 6,000 hours, $L_0$ is an L value measured in the CIE LAB color coordinate system before the light irradiation,
a' is an a value measured in the CIE LAB color coordinate system after irradiating the thermoplastic resin molded article with light under SAE J1960 conditions for 6,000 hours, $a_0$ is an a value measured in the CIE LAB color coordinate system before the light irradiation, and
b' is a b value measured in the CIE LAB color coordinate system after irradiating the thermoplastic resin molded article with light under SAE J1960 conditions for 6,000 hours, and $b_0$ is a b value measured in the CIE LAB color coordinate system before the light irradiation.

* * * * *